March 3, 1970   B. J. STEPTOE ET AL   3,498,109

PRESSURE TO ELECTRICAL TRANSDUCERS AND APPARATUS

Filed July 3, 1967

INVENTORS
BRIAN JOHN STEPTOE
DAVID HAWGOOD
DAVID GEORGE PARKINS
BY Hare and Bayley
ATTORNEYS «United States Patent Office»

3,498,109
Patented Mar. 3, 1970

3,498,109
PRESSURE TO ELECTRICAL TRANSDUCERS AND APPARATUS
Brian John Steptoe, Hitchin, and David Hawgood, Stevenage, England, and David George Parkins, Rockford, Ill., assignors to International Computers and Tabulators Limited, London, England
Filed July 3, 1967, Ser. No. 650,825
Claims priority, application Great Britain, July 8, 1966, 30,677
Int. Cl. G01b 13/04
U.S. Cl. 73—37.7
6 Claims

ABSTRACT OF THE DISCLOSURE

A transducer is disclosed for producing electrical signals in response to pressure fronts occurring in a flow of fluid through a chamber having an inlet opening and an outlet opening aligned therewith. A fluid source introduces fluid into the chamber at a point remote from the outlet. An object is passed along a track which intersects the fluid flow between the source and the chamber. A change of pressure is produced by the passage of the object across the flow of fluid and said change of pressure is measured by a piezo-electric member which is mounted so as to be acted upon by said change in pressure.

BACKGROUND OF THE INVENTION

Field of the invention

The present invention relates to transducers for producing electrical signals in response to pressure variations and to apparatus utilizing such transducers, particularly, but not exclusively, to record sensing apparatus.

Description of the prior art

Various forms of transducer for producing electrical signals in response to the application of pressure variations have previously been proposed. In particular, transducers for detecting changes in pressure in a fluid medium have previously used a closed chamber, one wall of the chamber being provided with a diaphragm, for example, the diaphragm being connected to a device for producing electrical signals in response to movements of the diaphragm produced by variations in pressure of the medium within the chamber.

However, such devices are not suitable for the detection of rapidly occurring changes of pressure in a moving stream of fluid, since the provision of a closed chamber in the fluid flow path prevents the movement of fluid. Even if arrangements are made to by-pass the chamber, it is found that the use of a closed chamber for this purpose may still produce an inaccurate output due to reflections from the end of the chamber and to the presence of a volume of unmoving fluid within the chamber.

SUMMARY

According to one aspect of the present invention, a transducer for producing electrical signals in response to changes in pressure includes a fluid channel bounded by at least one wall and having an outlet at one end; means for introducing fluid into said channel at a point remote from said outlet; a member responsive to changes in pressure acting thereon to generate electrical signals representative of such changes; means for conducting said electrical signals away from said member; and means for supporting said member in relation to said channel to permit changes in fluid pressure within said channel to act on said member.

The transducer may include a diaphragm set in one wall of the channel, and a mechanical linkage between said diaphraghm and a part of the member, the member being an elongate piezo-electric element. Alternatively, the member may be an elongate piezo-electric element supported to lie across the outlet of the channel to form a constriction thereto. Thus, a transducer according to the present invention avoids the use of a closed chamber and does not suffer from the disadvantages referred to in the preceding paragraph.

According to another aspect of the present invention, sensing apparatus includes a fluid channel having an outlet at one end from which fluid may flow; means for introducing fluid to flow into said channel at a point remote from said outlet; a member responsive to changes in pressure acting thereon to generate electrical signals representative of such changes, means for conducting said electrical signals away from said member; means for supporting said member in relation to said channel to permit changes in fluid pressure within said channel to act on said member; and a track along which objects may be passed, the track intersecting a path for flow of said fluid adjacent said channel, whereby the passage of an object across the fluid flow produces a variation in fluid pressure within said channel. The track may intersect the path of fluid flowing towards said channel or may intersect the path of fluid flowing from said outlet. In another form of sensing apparatus, the channel may have a further aperture spaced away from said outlet, and the fluid introducing means may then introduce fluid into said channel at a point intermediate said outlet and said aperture, the introducing means being arranged to divert substantially all the introduced fluid towards said aperture; said track lying adjacent said aperture. The objects passing along the track may be records carrying information-representing perforations.

DESCRIPTION OF PREFERRED EMBODIMENTS

Figure 1:
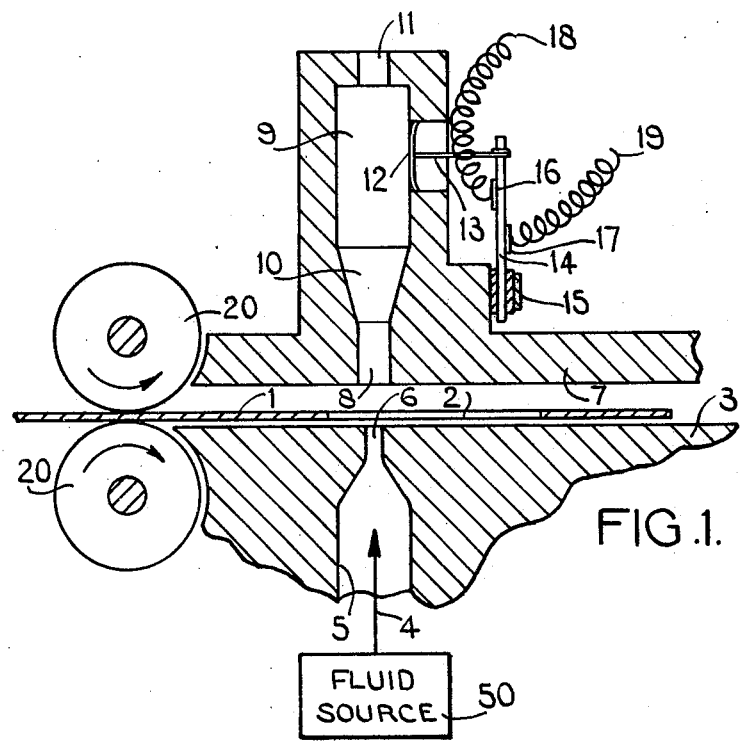
FIGURE 1 is a sectional view of a record sensing arrangement.

Referring now to FIGURE 1, a record, such as record card 1, carries information recorded in conventional manner by means of perforations, such as perforation 2. The use of perforations to represent information in record cards is well known in the art and such perforations have information-representing significance by virtue of their positions in the card.

The record card 1 is advanced along a track across a bed-plate 3 by conventional card feeding means, such as card feeding rollers 20. A source 50 of fluid, such as air, is connected to a channel 5 in the underside of the bed-plate 3, and, as indicated in the drawing, the fluid flows in the direction of arrow 4. The channel 5 narrows into a jet orifice 6 opening into the upper surface of the bed-plate 3. Thus, the track of record cards 1 fed along the bed-plate 3 intersects the path of fluid issuing from the orifice 6.

When, during the passage of the record card 1 across the bed-plate 3, a perforation 2 in the card 1 passes over the jet orifice 6, a jet of fluid passes from the orifice 6 through the perforation 2. A sensing head 7 is supported above the bed-plate 3 and is spaced away from the plate 3 to allow the card 1 to pass. The sensing head 7 carries an inlet passage 8 arranged opposite the jet orifice 6, so that the fluid jet issuing from the orifice 6 enters the inlet 8. The inlet 8 communicates with a sensing chamber 9 within the head 7 through a transition zone 10. The sensing chamber 9 has a greater cross-sectional area perpendicular to the fluid path than the inlet passage 8, and the sides of the transition zone 10 taper smoothly from the inlet passage 8 to the sensing chamber 9.

At the end of the sensing chamber remote from the inlet passage 8 is a restricted outlet passage 11. Thus, the path of fluid through the head 7 is determined by a channel formed by the inlet passage 8, the transition zone 10, the sensing chamber 9 and the outlet passage 10. In passing along this channel, the kinetic energy of the jet entering the inlet passage 8 is transformed into a pressure variation within the sensing chamber, and the outlet passage 11 provides a so-called resistive termination for the fluid flow path.

A piezo-electric element 14 is so supported in relation to the fluid channel through the head 7 as to be influenced by pressure variations within the chamber 9. For this purpose one end of the element 14 is clamped by means of clamping strip 15 to the head 7 outside the chamber 9, and a diaphragm 12 set in the wall of the chamber 9 is connected by a mechanical link 13 to the other end of the element 14. A pair of electrodes 16 and 17 are secured to the element 14 and a pair of wires 18 and 19 respectively are provided to carry electrical signals generated by distortion of the element 14 in response to movement of the diaphragm 12.

In operation, a jet of air from the source 50 issues from the orifice 6 and, in the absence of a record card 1, enters the fluid channel of the sensing head 7 by way of the inlet passage 8. The air passes out of the fluid channel through the exit passage 11, and by reason of the configuration of the channel a static pressure is applied to the diaphragm 12. This pressure causes the piezo-electric element 14 to be subjected to mechanical stress through the linkage 13 joining the element 14 to the diaphragm 12. If, now a record card 1 is advanced along the track intersecting the path of fluid flow between the orifice 6 and the inlet passage 8, the flow is interrupted, and the pressure within the sensing chamber 9 decreases, thus varying the stress on the element 14. If the record carries information-representing perforation 2 disposed along a track which intersects the fluid flow path, then the pressure in the sensing chamber 9 will be altered as each such perforation passes between the orifice 6 and the inlet passage 8, because the presence of a perforation in this position will allow fluid to flow into the channel of which the sensing chamber 9 is a part. Thus electrical signals are generated by the element 14 to correspond to the presence of perforations 2 in the record card 1 as the record card 1 is fed along the track above the bed-plate 3.

It will be realised that because the channel in the sensing head includes the inlet passage 8 and the outlet passage 11 the flow of fluid through the channel is not prevented, so that pressure variations in a continuously flowing fluid stream may be measured, pressure fronts corresponding to such variations passing across the diaphragm 12.

While the diaphragm 12 is shown as coupled to a piezo-electric element 14, it will be realised that the purpose of the element is merely to produce electrical signals in response to mechanical stress applied to it, and other pressure-or-strain-sensitive electrical signal generating elements may be employed for this purpose.

It will be realised that FIGURE 1, as is the case with the other figures, is intended to show the operation of the device and does not indicate either actual or relative dimensions of the part. For example, in one particular practical embodiment of the device, the jet orifice 6 was approximately 0.010" wide in the direction of movement of the record 1 but was substantially equal in width to the perforations 2 of the record 1 in the transverse direction. The spacing between the bed plate 3 and the sensing head 7, in the case described above, was not critical, and a satisfactory response was obtained for spaces of between 0.020" and 0.125". It is preferred that the inlet passage 8 is slightly larger than the orifice 6 to allow for a slight divergence of the fluid jet from the orifice 6, and a jet velocity of between 200 and 500 feet per second has been found to give satisfactory results.

Figure 2:
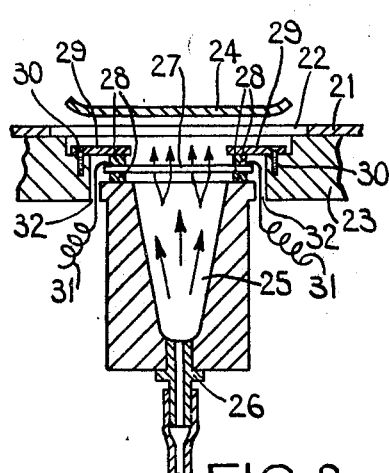
FIGURE 2 is a sectional view of an alternative record sensing arrangement.

The device shown in FIGURE 1 is arranged to sense the presence of a record card and to respond to the presence of perforations in a predetermined track along the card. It will be realised, however, that a sensing head, such as the head 7 may be used to detect the presence of other objects than record cards. For example a sensing head may be used to detect the passage of articles along a conveyor belt in a similar manner. In the arrangement described in the foregoing paragraphs, the objects to be detected are moved along a track which intersects the path of fluid flowing towards the sensing head 7. It will be realised that a fluid flow path which is an extension of the path of fluid flow through the channel in the sensing head and in which fluid is flowing away from the head may also be used to produce pressure variations to act on a sensitive member. Moreover, the pressure-sensitive member itself may be positioned in the fluid stream. FIGURE 2 shows an arrangement of this kind.

Referring now to FIGURE 2, a record card 21 carrying perforations 22 may be fed along a track over a bed-plate 23. A guide 24 is providing above the bed plate 23. The bed plate is recessed to provide a fluid chamber 25, and the chamber 25 is provided, at one end, with a connecting piece 26 to allow it to be connected to a source (not shown) of fluid such as air. The chamber 25 is somewhat shorter in the direction of feeding of the record than a record perforation 22 but is substantially the same width as a perforation in the transverse direction. A piezo-electric element 27 is supported across the length of the chamber 25. The element 27 is clamped at each end between resilient pads 28 by clamping strips 29 recessed into the bed-plate 23 and secured by screws 30. Electrodes are provided at each end of the element 27 and connections 31 from the electrodes are passed through holes 32 in the bed-plate 23. The element 27 is longer than the chamber 25 in order that it may be clamped at its ends but it is not so wide as the chamber 25, so that fluid from the chamber may pass around the sides of the element 27 to issue from the bed plate across the track along which the record card 1 is fed.

In operation, air is supplied through the connecting piece 26 into the chamber 25, which forms the channel through which air may flow to the record card track. The air, in passing around the element 27, subjects the element to mechanical stress, because in this case the element forms a constriction to the outlet for fluid from the channel. In the absence of a record card 21, the stress on the element is substantially constant. If a record card 21 is now moved across the path of air issuing from the chamber 25, the pressure within the chamber 25 is changed because the air flow path is restricted by the record card 21. If, however, the record card 21 carries perforations, such as the perforation 22, then, when the perforation 22 is aligned with the recess in the bed plate which forms the chamber 25, the air may once again escape from the chamber round the element 27. The variations in pressure within the chamber 25 produce representative variations in an electrical signal generated by the element 27.

It has been found that it is desirable to adjust the clamping pressure applied to piezo-electric elements to obtain optimum results. For example, too high clamping pressure produces poor output response, while if the element is insufficiently clamped, it exhibits a tendency to resonate. However, since the optimum pressure is difficult to predict with accuracy, since it depends upon the response characteristics of the individual element as well as the resilience of the clamping pads, it has been found advantageous to adjust the clamping screws, such as the screws 30 to obtain the required clamping pressure.

While the arrangements described in the foregoing paragraphs have been applied to the detection of perforations in a record card, it is to be understood that the present invention is not limited in application to this use. For example, the invention may be used in conjunction with fluid logic elements or with networks of such elements to provide output signals in the form of electrical pulses. In fluid logic elements of this kind, a jet of fluid, usually termed a power jet, is selectively deflected to issue from one of a number of outlet passages by the action of a controlling fluid stream, and a number of such elements may be combined in various kinds of networks for control purposes. In order to generate electrical signals to indicate the operational states of these elements, fluid from a particular passage may be applied to the inlet passage of one of the foregoing devices. Changes in pressure in the fluid flowing, and even changes in the mechanical stressing of the piezo-electric elements in the event of fluid flow cessation, then produce representative output electrical signals.

It will be realised that the shape of the sensing chamber 25 in the case of the arrangement of FIGURE 2 may be chosen to provide a transition zone acting in a manner similar to that of the zone 10 of the arrangement of FIGURE 1.

Figure 3:
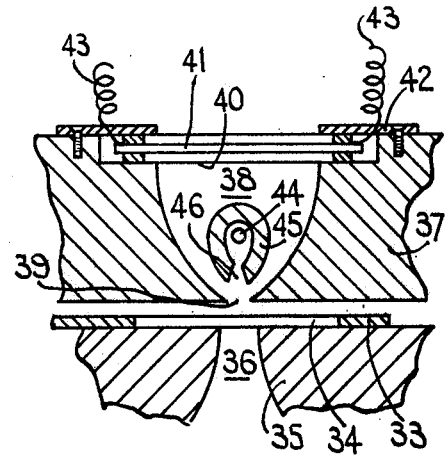
FIGURE 3 is a sectional view of a further record sensing arrangement.

A further arrangement using a pressure-sensitive element supported across a recess for the purpose of sensing a record card is shown in FIGURE 3. In this case, a record card 33, having perforation 34, is again fed along a track above a bed-plate 35. The bed-plate 35 has an aperture 36 opposite a sensing head 37 positioned above the card track. The head 37 has a chamber 38 having a small opening 39 in the bottom surface of the head 37, the opening 39 being positioned opposite the aperture 36 in the bed-plate 35. The upper end of the chamber 38 widens into an elongated opening 40. A piezo-electric element 41 is positioned across the length of the opening 40 and constricts the outlet for fluid from the chamber 38 as in the case of the arrangement of FIGURE 2. In much the same way, the element 41 is clamped at each end by clamping members 42 between resilient pads 43. Electrical connections 43 are provided at each end of the element 41.

Within the chamber 38 a fluid inlet passage 44 is provided and the inlet 44 is surrounded by a wall 45 having an opening 46 facing downwards towards the opening 39 in the chamber 38.

In operation, fluid is supplied to the inlet passage 44, and in the absence of a record card 33, substantially all the fluid from the inlet 44 passes out of the sensing head 37 through openings 46 and 39, and thence across the card track to the aperture 36. When, however, a record card 33 passes across the fluid flow path to the aperture 36, fluid from the inlet 44 within the head 37 passes round the wall 45 into the upper part of the chamber 38 and out through the opening 40, flowing round the element 41.

If a perforation 34 in the record card 33 is aligned with the aperture 36 in the bed-plate 35, then substantially all the fluid flowing from the head passes through the record card perforation 34 into the aperture 36 as before. In this case, pressure pulses are developed in the chamber 38 and the element 41 generates signals representative of record presence and of perforations in the record.

It will be realised that in all the foregoing examples, the pressure-sensitive element is responsive to changes in pressure, and not merely to absolute pressure. Thus, the chambers described are not required to be vented to atmosphere. Instead, the devices may be operated under conditions where, in the normal quiescent state, a static pressure above atmospheric exists. For example, the arrangement of FIGURE 3 may be operated in such a manner that the chamber 38 is always pressurised with respect to atmosphere, and provided that the pressure of the fluid supplied to the inlet 44 is greater than the normal quiescent working pressure of the system, the pressure wave produced in the absence of a record card perforation when fluid is admitted through the inlet 44 will be detected by the element. For this case, working at normal quiescent pressures slightly above atmospheric ensures, for example, that an accumulation of card dust does not collect in the chamber due to the prolonged passage of unperforated cards past the chamber opening 39.

What is claimed is:

1. A transducer for producing electrical signals in response to changes in pressure including a chamber bounded by a wall; an outlet at one end of said chamber; means for introducing fluid into said chamber at a point remote from said outlet to produce a fluid flow through said chamber and said outlet; a diaphragm set in said wall; an elongate piezo-electric member responsive to changes in stress applied thereto to generate electrical signals representative of such changes in stress; means for conducting said electrical signals away from said member; means for resiliently clamping one end of said member; and a mechanical linkage between said diaphragm and a part of said member spaced away from said one end, movement of said diaphragm due to pressure change in said fluid flow being effective through the mechanical linkage to stress the piezo-electric member to generate electrical signals representative of said pressure changes.

2. A transducer for producing electrical signals in response to changes in pressure including a chamber bounded by a wall; an outlet for fluid at one end of said chamber; means for introducing fluid into said chamber at a point remote from said outlet to produce a fluid flow along a path through the chamber; an elongate piezo-electric member responsive to changes in pressure acting thereon to generate electrical signals representative of such changes; means for conducting said electrical signals away from said member; means for supporting said member across said outlet including means for separately resiliently clamping the two opposite ends of the elongate piezo-electric member, said element partially closing said outlet.

3. Sensing apparatus including a chamber having an outlet for fluid flow; means for introducing fluid into the chamber at a point remote from said outlet to produce a fluid flow through the chamber; a member in said fluid flow responsive to changes in pressure acting thereon to generate electrical signals representative of such changes; means for conducting said electrical signals away from said member; means for supporting said member to permit changes in fluid pressure within said chamber to act on said member; a track for the passage of objects; said track intersecting the fluid flow from said outlet, the passage of an object across the fluid flow being effective to produce a variation in fluid pressure within the chamber.

4. Sensing apparatus including a chamber having a first outlet for fluid flow; a second outlet for fluid flow spaced from said first outlet; means for introducing fluid into the chamber at a point intermediate the first and second outlets to produce a fluid flow through the chamber substantially all the introduced fluid being directed toward said second outlet; a member responsive to changes in pressure acting thereon to generate electrical signals representative of such changes; means for conducting said electrical signals away from said member; means for supporting said member to permit changes in fluid pressure within said chamber to act on said member; a track for the passage of objects; said track being adjacent said second outlet; the passage of an object adjacent the second outlet being effective to reduce the fluid flow from said second outlet.

5. Sensing apparatus as set forth in claim 4 in which the means for introducing fluid into the chamber includes a guide member to direct substantially all the introduced fluid toward said second outlet.

6. Sensing apparatus including a chamber having an inlet opening and an outlet opening aligned therewith; a track for the passage of objects; a source of pressurised fluid directed toward an inlet of said chamber to produce a fluid flow along a path passing through said chamber and intersecting with said track between said source and the inlet of said chamber; means responsive to changes of pressure in the chamber; an object in the track at the intersection with said path being effective to interrupt said fluid flow along the path and thereby produce a change in pressure in said chamber.

References Cited

UNITED STATES PATENTS 2,900,468  4/1959  Joy.
3,270,960  9/1966  Phillips.

FOREIGN PATENTS 202,691  4/1922  Great Britain.

LOUIS R. PRINCE, Primary Examiner
WILLIAM A. HENRY II, Assistant Examiner